Figure 1:
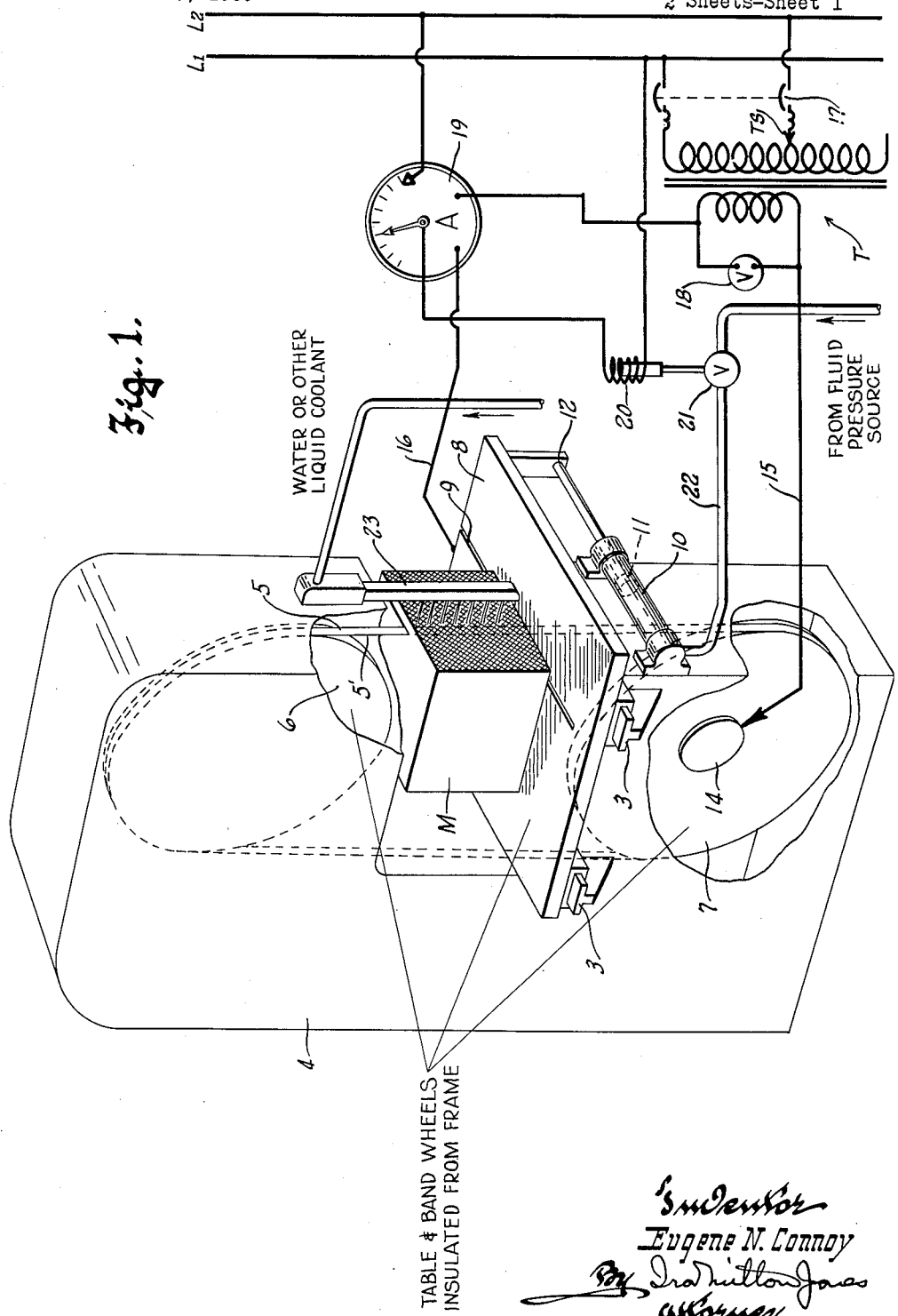

May 15, 1962 — E. N. CONNOY — 3,035,150
METHOD OF CUTTING THIN-WALLED CELLULAR OR HONEYCOMBED METAL
Filed Feb. 19, 1960 — 2 Sheets-Sheet 1

Inventor
Eugene N. Connoy
By Ira Sutton Jones
Attorney

May 15, 1962 E. N. CONNOY 3,035,150
METHOD OF CUTTING THIN-WALLED CELLULAR OR HONEYCOMBED METAL
Filed Feb. 19, 1960 2 Sheets-Sheet 2

Inventor
Eugene N. Connoy 3,035,150
METHOD OF CUTTING THIN-WALLED CELLULAR OR HONEYCOMBED METAL
Eugene N. Connoy, Minneapolis, Minn., assignor to Continental Machines, Inc., Savage, Minn., a corporation of Minnesota
Filed Feb. 19, 1960, Ser. No. 9,732
1 Claim. (Cl. 219—69)

This invention relates broadly to metal cutting and refers more particularly to a method of cutting cellular or honeycombed metal such as the cores of radiators or heat exchangers, and the lightweight "honeycomb" now being used as reinforcement in airplanes.

Because of the very thin walls of such honeycombed or cellular material, it has been extremely difficult in the past to cut the same either "cross grain," i.e. transversely to the cells which extend longitudinally through the material, or longitudinally thereof. Conventional metal cutting methods are entirely unsatisfactory. Shearing is obviously out of the question, and if mechanical sawing is resorted to, whether it be by a band saw or a circle saw, the thin fragile walls of the cells are distorted and torn, with the result that the "surface" of the cut is anything but accurately flat and free from burrs.

By contrast, this invention makes it a simple matter to cut through the most fragile cellular or honeycombed material, as long as it is electrically conductive. For instance, cores for radiators and the heat exchangers which consist of thin-walled copper tubes connected by extended surface fins of thin aluminum foil, can be cut by the method of this invention at a rate of fifty square inches per minute, with assurance that the freshly cut surfaces will be flat within $\pm 1/64$ of an inch per inch, and the tubes and fins virtually free of burrs.

Stainless steel honeycomb made of .003" thick foil has also been cut at a rate of fifty square inches per minute with the machined or cut surfaces free of burrs and flat within $\pm .003"$ per inch.

In another test of this invention, stainless steel honeycomb made of .0015" foil with the piece being cut fifteen inches high and twenty-five inches long, has been cut at a rate of 170 square inches per minute, with the cut surfaces flat within $\pm .015"$ per inch.

Aluminum honeycomb forty inches thick has been cut by the method of this invention at a rate of 50–200 square inches per minute, with an accuracy ranging from $\pm .003"$ per inch of area at the lowest cutting rate to $\pm 1/64"$ per inch at the highest cutting rate.

Broadly stated, the invention utilizes an electric arc or, more accurately, a multiplicity of arcs maintained between the material being cut and an endwise moving blade or band, while the entire cutting zone is bathed with a liquid arc quenching coolant which is preferably ordinary tap water.

Although direct current may be employed, alternating current has been found preferable. The voltage of the applied current desirably ranges between 8 and 15 volts, but a wider range, as for instance 1–40 volts, can be employed. The voltage selection is dependent on the surface finish required. A low voltage produces a fine, smooth finish and the higher voltages produce a rougher finish but allow a faster cutting rate. As an example, with an applied voltage of 25 volts the cutting rate may be as high as 200 square inches per minute.

The amperage of the applied current depends upon the cutting rate and the work thickness. Thus, for example, in cutting through forty inches of expanded stainless steel honeycomb with an applied voltage of 15 volts and at a rate of fifty square inches per minute, approximately 600 amperes will be drawn; whereas in cutting through six inches of the same material with an applied voltage of 6 volts and at a rate of twenty square inches per minute, the current drawn drops to approximately thirty amperes.

As already indicated, the entire cutting zone is bathed with liquid arc quenching coolant, preferably tap water. To assure that the coolant will reach all portions of the cutting zone, it is projected from a plurality of nozzles pointed into the exposed ends of the cells of the honeycomb material being cut. Thus, it readily reaches all portions of the material at the exact point or points where the arcs are cutting or burning through the material. The resulting quenching confines the arcs to the metal directly in front of the "cutting" edge of the band or blade.

The heat resulting from the burning or cutting action of the arc is not only carried off by the coolant, but also by conduction within the material itself due to its very large ratio of surface area to mass.

Figure 2:
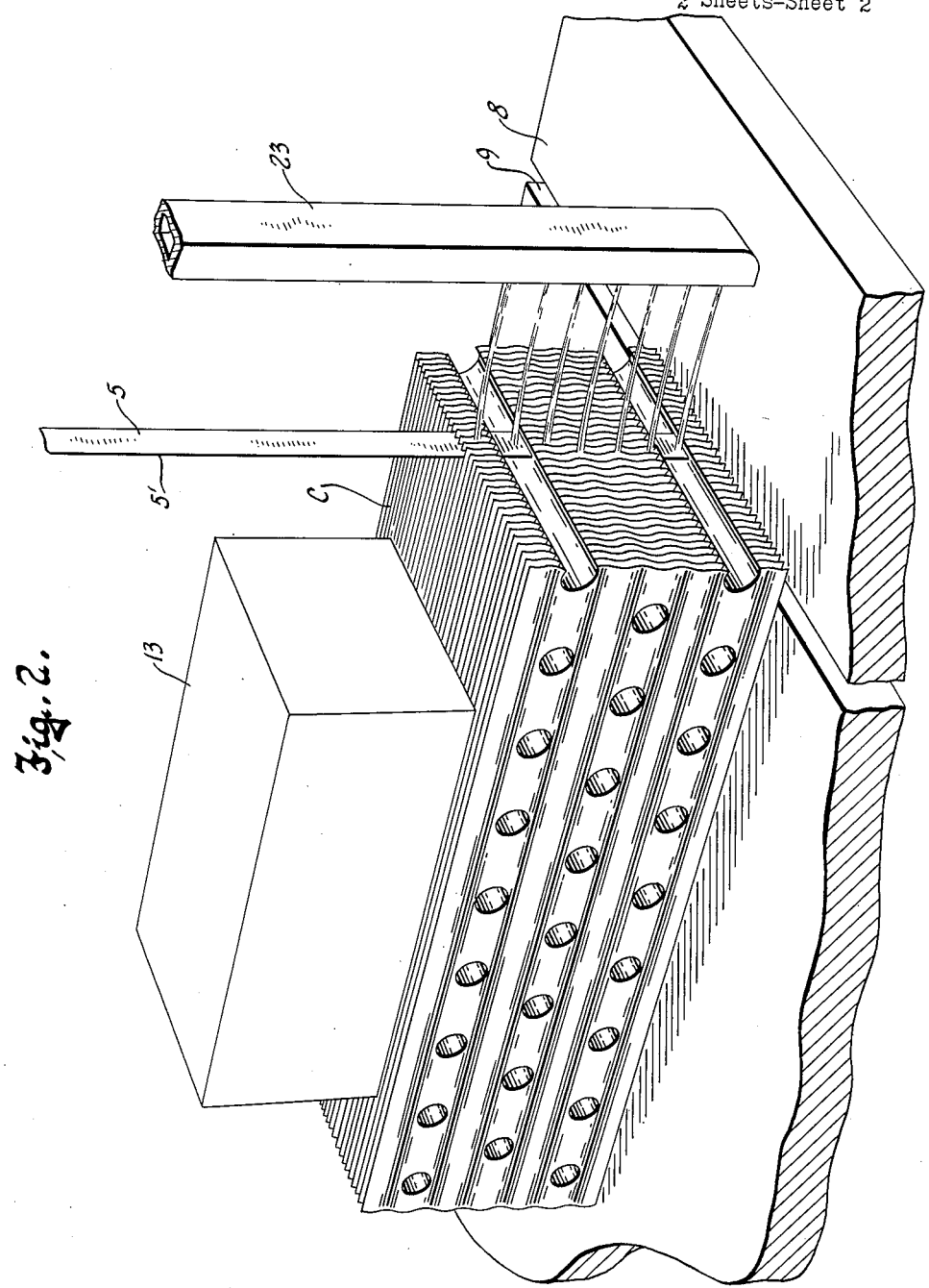

Although the invention probably is understandable from the foregoing description, so that drawings may not be needed, for convenience and for the sake of completeness of disclosure, drawings have been supplied and in these:

FIGURE 1 is a diagrammatic perspective view illustrating one embodiment of this invention; and FIGURE 2 is a perspective view showing an actual radiator core being cut by a machine operating in accordance with this invention.

With reference to the drawings, the practice of the method of this invention is most conveniently carried out by means of a machine in the nature of a band saw having an endless band or blade 5 trained about spaced upper and lower pulleys 6 and 7, respectively. The pulleys 6 and 7 are mounted in any suitable way upon the frame 4 of the machine with the pulley 6 above and the pulley 7 below a work supporting table 8. The table and the pulleys are electrically insulated from one another and also from the frame of the machine.

One stretch of the band, i.e. its working stretch, travels downwardly through an elongated opening or slot 9 in the work table so that the table may be moved horizontally along a path parallel to its slot 9. Obviously, of course, the table rides upon ways 3, and a hydraulic work feed cylinder 10 effects relative work feeding motion between the table and the moving blade or band. The cylinder 10 is fixed to the frame of the machine and its piston 11 is connected to the table, as at 12. Hence, when the pressure in the left-hand end of the cylinder exceeds the pressure in its other end, work feeding motion will be imparted to the table.

The band or blade 5 may be simply a metal ribbon, preferably steel, but it has been found desirable to have its leading edge 5' rather sharp. Apparently this has the desirable effect of concentrating the arcs in a very narrow zone.

The material to be cut (designated by the letter M) is, of course, placed upon the table 8 and moves with it, being held to the table in any suitable manner. In FIGURE 2, where a radiator core C is shown being cut, a weight 13 is shown holding the core on the table.

One of the pulleys 6—7, or both, if desired, may be driven in any suitable manner so as to continually propel the band or blade 5 down through the cutting zone. The pulleys are of metal and through a slip ring device 14 one of the pulleys (the lower pulley 7 in this case) is connected by means of a conductor 15 to one side of an electric current source, specifically one side of the secondary of a transformer T. The other side of this current source is connected to the material to be cut, in practice by connecting a lead 16 with the metal table by which the material placed thereon is advanced towards the moving band or blade.

The transformer T steps down the voltage to the desired value, and to enable adjustment thereof the primary of the transformer is tapped, and its taps are selectively connectible with the supply line through a tap switch TS. Although as indicated hereinbefore, the arcing voltage, i.e. the voltage between the band or blade 5 and the material being cut, may range from 1 to 40, in practice a range of 8 to 15 volts has been found entirely satisfactory. Accordingly, the taps provide a voltage range of 6 to 24 volts in two-volt increments.

A circuit breaker 17 is preferably interposed between the primary and the line which may be a single phase 60 cycle, 220 volt A.C. power line, and if desired a voltmeter 18 may be connected across the secondary of the transformer to show the applied voltage.

It is to be observed that the circuit by which a potential is maintained between the moving band or blade 5 and the material being cut incorporates a contact type A.C. ammeter 19, the contacts of which are connected in an energizing circuit for the solenoid 20 of an electromagnetically actuated valve 21 connected in the pressure supply line 22 leading to the left-hand end of the hydraulic cylinder 10. Energization of the solenoid 20 closes the valve 21. Hence, by means of the ammeter 19, the advance of the table and the material carried thereby will be interrupted whenever the amperage of the current drawn by the arcs exceeds a predetermined value, as determined by the setting of the movable contact of the ammeter. Thus, for instance, this contact of the ammeter may be set to interrupt advance of the material when the amperage reaches 300 and, of course, by this means a dead short between the moving blade 5 and the material being cut can be avoided.

Concomitantly with the start of the cutting operation, a liquid coolant, preferably ordinary tap water, is projected into the entire cutting zone. This is preferably done by means of an elongated nozzle 23 or a plurality of nozzles having a multiplicity of orifices from which jets of liquid coolant issue. The nozzle or nozzles are mounted so as to project the jets of liquid through the cells of the cellular honeycombed material and against the blade 5. Thus, the nozzle 23 should be movably mounted to allow its being positioned in transverse alignment with the operative stretch of the band or blade and close to the exposed end of the material being cut.

The liquid coolant is supplied to the nozzle 23 under pressure in any suitable conventional manner and, as will be readily understood—though the diagrammatic illustration in FIGURE 1 does not show it—the table has a trough or collecting pan built around it to collect the coolant for re-use. From the collecting trough or pan the coolant is conducted to the reservoir of the coolant supply system and, from thence, to a pump by which it is delivered to the nozzle or nozzles 23.

From the foregoing description taken together with the accompanying drawings, it should be readily apparent to those skilled in this art, that this invention makes it possible to accurately and smoothly cut very thin-walled cellular or honeycombed material, as long as it is made of metal or other electrically conductive material; and that because of the extreme accuracy obtainable with the invention, "logs" of cellular or honeycombed metal may be cut into slices as thin as ⅛" with assurance that the opposite sides or faces of the cut slices will be parallel and virtually free from burrs or other objectionable irregularities.

What is claimed as my invention is:

The method of cutting thin-walled sections of electrically conductive cellular or honeycombed material such as metal radiator cores and the like, which comprises: electrically connecting the material to be cut with one side of a source of alternating electric current, connecting the other side of said current source with a thin lengthwise moving electrically conductive band having substantial width compared to its thickness; effecting relative feeding motion between the material to be cut and said electrically conductive band in a direction edgewise of the band to bring the two contiguous to one another, whereupon arcing occurs between the work and the leading edge of the band; continuing said relative feeding motion at a rate which keeps the leading edge of the band at all times spaced from the material being cut to thus maintain arcing between the material and said edge of the band, by which arcing cutting of the material is effected; and projecting water through the cellular material transversely of the endwise moving band and laterally against one side of the band for the full length thereof acting upon the material to thereby quench the arc and minimize erosion of the metal at opposite sides of the cut.

References Cited in the file of this patent

UNITED STATES PATENTS

| | | |
|---|---|---|
| 2,592,894 | Harding | Apr. 15, 1952 |
| 2,794,110 | Griffith | May 28, 1957 |
| 2,903,557 | Matulaitis | Sept. 8, 1959 |
| 2,906,853 | Sibley | Sept. 29, 1959 |